United States Patent [19]

Matsumi et al.

[11] Patent Number: 5,317,457
[45] Date of Patent: May 31, 1994

[54] DIGITAL SIGNAL RECORDING METHOD

[75] Inventors: Chiyoko Matsumi, Suita; Akira Iketani, Higashiosaka; Akifumi Ide, Kawanishi; Tatsuro Juri, Osaka, all of Japan

[73] Assignee: Matsushita Electric Industrial Co., Ltd., Kadoma, Japan

[21] Appl. No.: 741,048

[22] Filed: Aug. 6, 1991

[30] Foreign Application Priority Data

Aug. 6, 1990 [JP] Japan .................................. 2-208606

[51] Int. Cl.⁵ .............................................. G11B 5/09
[52] U.S. Cl. .................... 360/48; 360/77.14; 360/77.15; 360/27
[58] Field of Search ..................... 360/27, 77.14, 77.15, 360/48

[56] References Cited

U.S. PATENT DOCUMENTS

| | | | |
|---|---|---|---|
| 4,511,933 | 4/1985 | Höfelt et al. | 360/77.14 |
| 4,890,173 | 12/1989 | Yokozawa | 360/77.15 |
| 5,088,077 | 2/1992 | Lemoine | 360/77.14 |
| 5,177,649 | 1/1993 | Iwakami et al. | 360/77.14 |

Primary Examiner—Robert J. Pascal
Assistant Examiner—Haissa Philogene
Attorney, Agent, or Firm—Wenderoth, Lind & Ponack

[57] ABSTRACT

A specific section provided in a track is set in a DC free state, and during reproducing, accurate tracking is conducted on the basis of the crosstalk from the pilot tone superposed in the adjacent tracks in this DC free section. Alternatively, a pilot tone is generated only in a specific section provided in the track, and when reproducing, accurate tracking is effected on the basis of the crosstalk of the pilot tone in the tracks adjacent to this section. As a result, the redundancy required for tracking is notably reduced.

12 Claims, 4 Drawing Sheets

DIGITAL SIGNAL RECORDING METHOD

BACKGROUND OF THE INVENTION

1. Field of the Invention

The present invention relates to a method of recording a digital signal suited to the reproduction of recorded signals with few errors by accurately tracing the recording tracks formed on a recording medium.

2. Description of the Prior Art

When recording a digital signal magnetically on a narrow track, presently, in order to track accurately and reproduce the signals with fewest errors, pilot tones of several different frequencies are superposed in each track of the data to be recorded at the time of recording. For example, as shown in FIG. 2, using pilot tones of four different frequencies, a case of recording on a magnetic tape is explained below. In this case, the recording tracks continuously formed on the recording medium (hereinafter called tracks) are sequentially supposed to be T1, T2, T3, T4, and so forth. Besides, the frequency of the pilot tone to be superposed on track T1 is supposed to be f1 (Hz), the frequency of the pilot tone to be superposed on track T2 is to be f2 (Hz), the frequency of the pilot tone to be superposed on track T3 is to be f3 (Hz), and the frequency of the pilot tone to be superposed on track T4 is to be f4 (Hz). The pilot tone frequencies f1 to f4 are recycled in a period of four tracks, and are superposed on each track.

When reproducing, for example relating to track T2, by sampling and comparing the crosstalk levels of the pilot tones (f1 Hz, f3 Hz) from the both side tracks T1 and T3, the tracking is controlled so that both levels are identical. In other words, it is controlled so that the center of the reproducing head When tracing the track T2 may correctly trace the center of the track T2. Then, by sampling and comparing the crosstalk levels of both side pilot tones (f2 Hz, f4 Hz) while scanning the track T3, the tracking is controlled so that both levels are identical. Similarly, while scanning the track T4, the crosstalk levels of the pilot tones (f3 Hz, f1 Hz) are compared. While scanning the track T5, the crosstalk levels of the pilot tones (f4 Hz, f2 Hz) are sampled and compared to control the tracking. The crosstalk of each pilot tone is extracted by a band-pass filter from a reproduced signal.

In such a constitution, in order to track accurately, the crosstalk level of the pilot tone of such an extent as to not be easily affected by noise must be detected by the bandpass filter to compare the levels. Or, for the pilot tone to be detected, the data components of the pertinent frequency may be also be regarded as noise. Therefore, the recording level of the pilot tone must be higher than the level of the data signal by about more than ten to twenty decibels. However, when a pilot tone of such a high level is superposed on the data signal in an analog fashion, it is equivalent to noise as seen from the data signal, and errors increase in the reproduced data. Or, to avoid this, when a pilot tone of a high level is digitally added to the data signal, generally, the recording rate increases, thereby making it difficult to record and reproduce.

SUMMARY OF THE INVENTION

It is hence a primary object of the invention to present, in the light of the above background; a digital signal recording method of a capable of lowering the signal level of the pilot tone to be superposed, and a digital signal recording method which is low in its rate of its increase of recording rate and which is capable of raising the level of the pilot tone to be superposed.

It is a first feature of the invention to set a signal in a specific section in a track to be a DC free state, out of signals recorded on a track. The frequency of the pilot tone is set at a relatively low frequency. Therefore, even in the case of azimuth recording, such a low frequency component induces a relatively large crosstalk in an adjacent track. On the other hand, since the signal in the specific section in the track is in a DC free state in which a recorded bit stream contains few DC components and few low frequency components near DC, the signal level near the pilot frequency in this section is sufficiently smaller than the crosstalk level of the pilot tones from the adjacent tracks. Thus, in the present invention, since the DC component of the signal and the low frequency spectrum are lowered in a specific section, if the signal level of the pilot tone to be superposed is low, a necessary crosstalk level is obtained.

It is a second feature of the invention to set the frequency spectrum of the pilot tone of a signal in a specific section larger than the spectrum at the same frequency of a signal to be recorded outside this specific section, by adding redundant information only to the specific section in the track, of signals to be recorded in the track. For the signal in an ordinary state, a specific frequency component will not always become large. Therefore, to normally generate a pilot tone having an adequately large level, a special control is necessary after adding the redundant information for this purpose. Furthermore, if the redundant information to be added is too much, the recording density is high, and if accurate tracking is to be performed, than the reproduction error rate increases. In the present invention, accordingly, by adding the redundant information only in the specific section in the track, the pilot tone necessary for tracking is generated only in this section. As a result, accurate tracking is possible without increasing the recording density very much.

BRIEF DESCRIPTION OF THE DRAWING

FIGS. 5(a)–56(e) are explanatory diagrams of a constitution of parties of an error correction code in a second embodiment of the present invention.

DESCRIPTION OF THE PREFERRED EMBODIMENTS

Figure 1A:
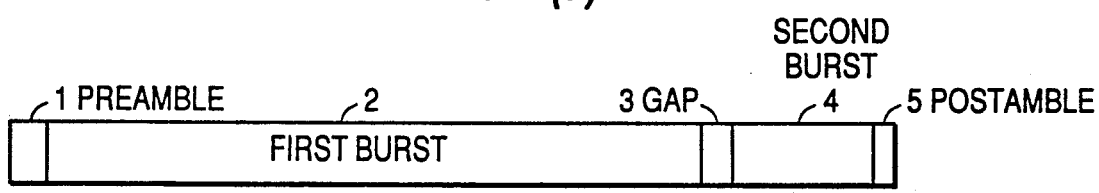
FIG. 1(a) is an explanatory diagram of the recording format of one track.
Figure 1B:
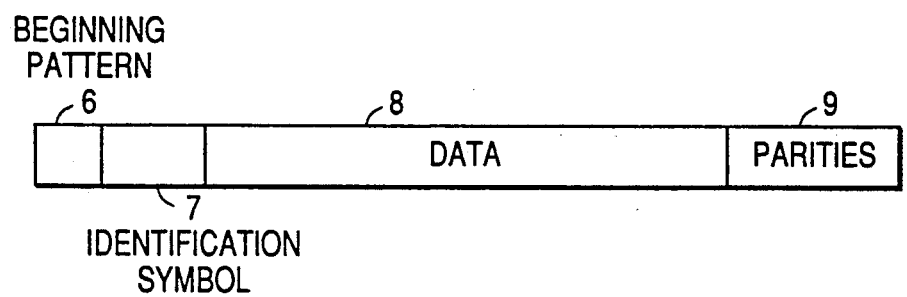
FIG. 1(b) is an explanatory diagram of a minimum unit of one recording.

A first embodiment of the invention is described below. A shown in FIG. 1(a), a track is composed of, sequentially from the beginning, a preamble 1, a first burst 2 composed of $N_1$ synchronous blocks, a gap 3, a second burst 4 composed of $N_2$ synchronous blocks, and a postamble 5. As shown in FIG. 1(b), a synchronous block which is the minimum unit of data processing in block recording is composed of a pattern 6 showing its beginning, an identification symbol 7 of the block, data 8, and parities of error correction code 9.

Figure 3A:
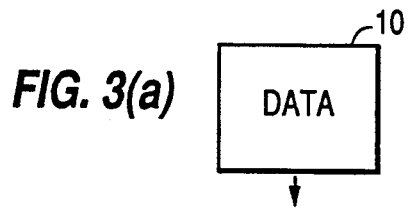
FIGS. 3(a)–3(e) are explanatory diagrams of a constitution of parities of an error correction code in accordance with a first embodiment of the present invention.
Figure 3B:
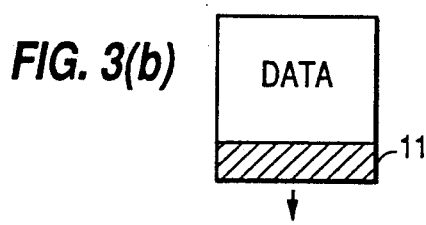
Figure 3C:
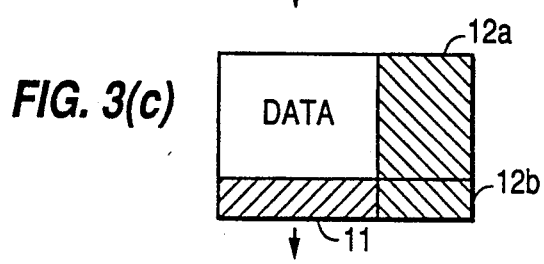
Figure 3D:
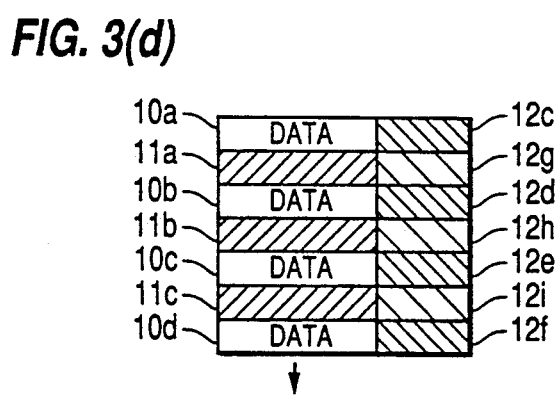
Figure 3E:
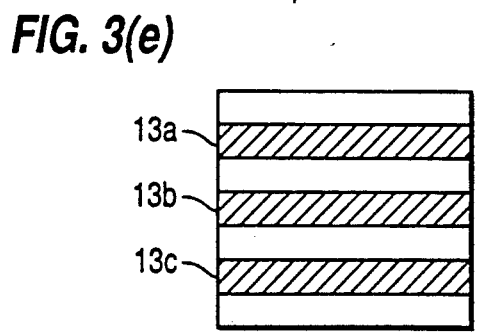
Figure 5A:
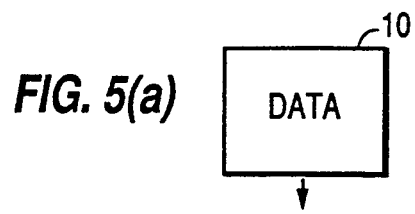
Figure 5B:
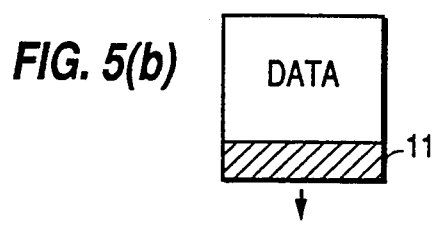
Figure 5C:
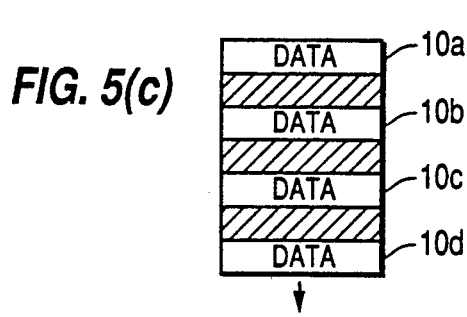
Figure 5D:
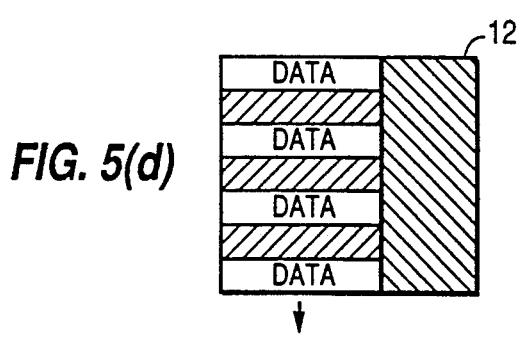
Figure 5E:
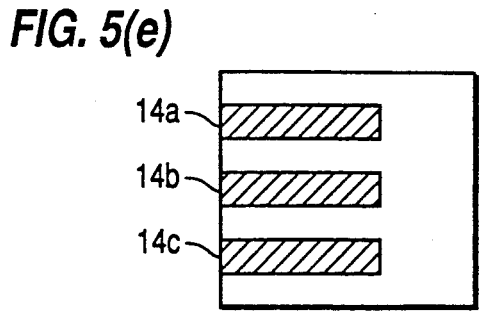
Figure 4A:
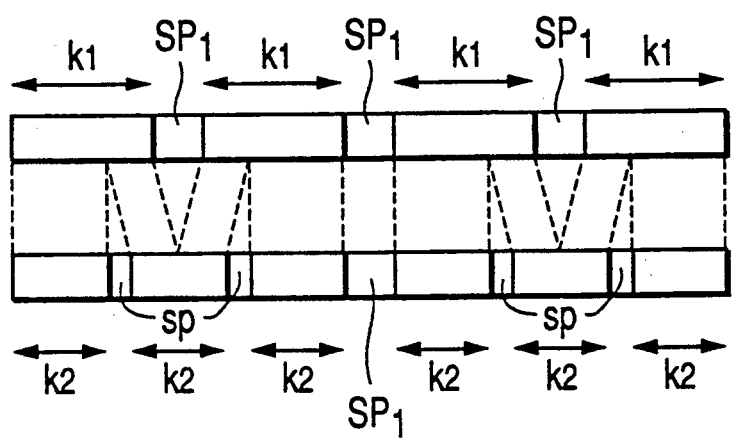
FIGS. 4(a)–4(b) are explanatory diagrams of bit division.
Figure 4B:
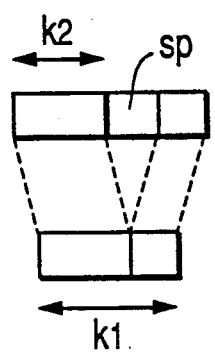

In such method of data error correction coding, for the data 10 (FIG. 3(a)) arranged two-dimensionally (rectangularly), first outer coding is effected in the row direction to add parities 11 of outer code (FIG. 3(b)), then inner coding is effected in the line direction to add parities 12a of inner code (FIG. 3 (c)). Next, rearranging the data in the line unit, the lines each consisting of the parities 11 of the outer code and the parities 12b of the inner code relating to these parities 11 are dispersed in between the lines each consisting of data 10a to 10d and parities 12c to 12f of the inner code relating to the data 10a to 10d (FIG. 3(d)). Here, supposing K1.k1=K2.k2 (K1, k1, K2, k2 are natural values, and k2>k2), as shown in FIG. 4(a), data bit k1 having a space SP1 is divided again in every k2 bits, and, as shown in FIG. 4(b), a space SP (k1-k2 pieces of 0) of every k1-k2 bits is inserted in every k2 bits. This space SP is generated by raising the signal processing rate to more than the blanking period of the video signal and the original data rate.

Consequently, parities 11a to 11c of outer codes of K1 lines, and parities 12g to 12i of inner codes relating to the parities 11a to 11c are dispersed as patterns of K2 lines. Afterwards, by adding the identification symbol 7, and modulating by using a k1/n conversion code for converting a data word of k1 bits into a code word of n bits, the beginning pattern 6 is added to every inner code word, thereby composing the synchronous block. Meanwhile, this k1/n conversion code is used for providing the bit stream to be recorded with a characteristic suited to the recording and reproducing system, and finally reducing the bit error rate. At this time, the parities of the inner code corresponds to the parities 9. The modulation by the k1/n conversion code is actually considered to be modulated by the k2/n modulation code in the portion 13 in which a space of every k1-k2 bits is inserted (shaded areas in FIG. 3(e)). This is because the actual information quantity of the data word of k1 bits in which the space SP of k1-k2 bits is inserted, that is, the value taken by the data word, is only for k2 bits.

Therefore, in the k1/n conversion code, if not DC free, since k1>k2, it is possible to set DC free by the k2/n conversion code. In this case, DC free state refers to the condition in which the DC components are few in the bit stream to be recorded, and the low frequency components near the DC are also few. A feature of such a DC free state is that the individual difference of 1 and 0 in the bit stream to be recorded settles within a specific finite value regardless of the type of data. Naturally, for such a feature, the code word to be recorded should be redundant, and the redundancy of the code word is higher in the k2/n conversion code (k1>k2) than in the k1/n conversion code, and the control of DC free state is easier. On the other hand, in the preamble 1, gap 3, and postamble 5, since the pattern can be set arbitrarily, the DC free pattern can be selected.

In such constitution, in this embodiment, the synchronous block composed of preamble 1, gap 3, postamble 5, and parity symbol of outer code may be set in a DC free state. An example of a pattern for setting the preamble 1, gap 3 and postamble 5 in DC free state is . . . 011001100110011001 . . . Supposing k1=8, k2=4, n=12, the DC free 4/12 conversion code is necessary, and an example is shown in Table 1. In this embodiment, meanwhile, it is sufficient for the frequency of the pilot tones of the tracks adjacent to the specific section to be different, and the two frequencies of pilot tones may be sufficient.

TABLE 1

| Data word | Code word |
| --- | --- |
| (0000) | (1111 0011 0000) = F30$_h$ |
| (0001) | (1110 0111 0000) = E70$_h$ |
| (0010) | (1111 0001 1000) = F18$_h$ |
| (0011) | (1110 0011 1000) = E38$_h$ |
| (0100) | (1100 1111 0000) = CF0$_h$ |
| (0101) | (1111 0000 1100) = F0C$_h$ |
| (0110) | (1100 0111 1000) = C78$_h$ |
| (0111) | (1110 0001 1100) = E1C$_h$ |
| (1000) | (1100 1100 1100) = CCC$_h$ |
| (1001) | (1100 0011 1100) = C3C$_h$ |
| (1010) | (1100 0000 1111) = C0F$_h$ |
| (1011) | (1110 0000 0111) = E07$_h$ |
| (1100) | (1111 0000 0011) = F03$_h$ |
| (1101) | (1100 0110 0011) = C63$_h$ |
| (1110) | (1100 1100 0011) = CC3$_h$ |
| (1111) | (1100 0011 0011) = C33$_h$ |

Figure 2:
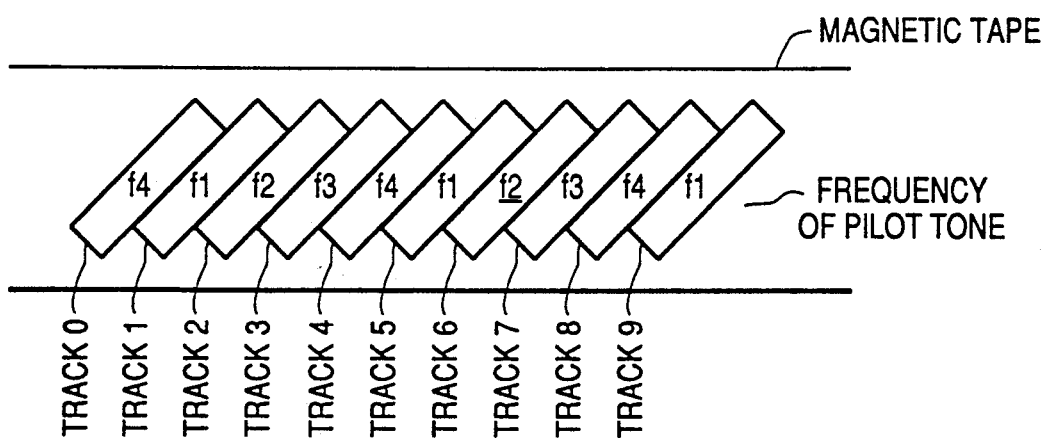
FIG. 2 is an explanatory diagram showing an example of a track pattern on a magnetic tape.

A second embodiment of the invention is described below. Unlike the first embodiment, this embodiment does not superpose the pilot tone in an analog fashion, but generates it digitally. FIGS. 5(a)-5(e) are explanatory diagrams of the composition of data and parities. FIGS. 5(a)-5(e), numeral 12b is parity of inner code. The composition of the track and synchronous block is same as in the first embodiment. The data error correction coding method shown in FIGS. 5(a)-5(e) to first applies an outer coding in the row direction to the data 10 arranged two-dimensionally (rectangularly) (FIG. 5(a)), and parities 11 of outer code are added (FIG. 5(b)). Rearranging the data in the line unit, the lines 11a to 11c composed of parities of outer code are dispersed among lines 10a to 10d composed of data (FIG. 5(d)). Here, as in the first embodiment, supposing K1.k1=K2.k2 (K1, k1, K1, k2 being natural numbers, and k1>k2), and, as shown in FIG. 2, the data k1 bits having a space SP1 are divided again into k2 bits, and the space SP (k1-k2 pieces of 0) of k1-k2 bits is inserted in every k2 bits. This space is generated by raising the signal processing rate so as to be higher than the blanking period of video signal, and the original data rate.

Therefore, the parities 11a to 11c of outer codes of K1 lines are dispersed as patterns of K2 lines. Afterwards, after adding the parities 12b of the inner code by inner coding in the line direction, the identification symbol 7 is added, and modulation is effected by using a k1/n conversion code. Furthermore, by adding the beginning pattern 6 to every inner word, a synchronous block is composed. At this time, the parities 12b of the inner code corresponds to the parities 9. As in the first embodiment, in the parts 14a to 14c (shaded area in FIG. 5(e)) where a space of every k1-k2 bits is inserted, modulation by a k2/n conversion code is effected, so that the DC may be set free.

In such constitution, in this embodiment, the synchronous block composed of preamble 1, gap 3, postamble 5, and inspection symbol of outer code may be set in a DC free state. An example of a pattern for setting DC free in the synchronous block composed of preamble 1, gap 3, postamble 5 and parities of a outer code, and an example of conversion code for setting DC free in the synchronous block composed of parities of outer code may be same as in the first embodiment.

A third embodiment of the invention is described below. In the portion where DC can be set free in the first embodiment (the parts 13a to 13c in which the preamble 1, gap 3, postamble 5, and space of every k1–k2 bits are inserted, (or the shaded area in FIG. 3(e)), the pilot tone can be inserted digitally. First, an example of pattern for setting DC free in the preamble 1, gap 3, and postamble 5 is shown below. Supposing n=12, two types of 12-bit patterns are considered, that is, C1=(1111 0011 1100) and C2=(0000 1100 0011); using the pattern repeating C1, C2 three times each and ..., C2, C1, C1, C1, C2, C2, C2, C1, C1, C1, C2, C2,
C2, C1, C1, C1, C2, C2, C2, C1, ...

and the pattern repeating C1, C2 six times each and

..., C2, C1, C1, C1, C1, C1, C1, C2, C2, C2, C2, C2,
C2, C1, C1, C1, C1, C1, C1, C2, ...

pilot tones of two frequencies can be generated. In all of the preamble, gap and postamble, it is advantageous because the recording rate is not increased even when digitally generating pilot tones.

Furthermore, by the modulation with the k2/n conversion code used in the space inserted portion, it is possible to generate pilot tones. An example of a 4/12 conversion code necessary when supposing k1=8, k2=4, n=12 is given in Table 2. Actually, the code words in Table 2 are in pairs with the inverted code words obtained by inverting 0 to 1, and 1 to 0, and pilot tones of two different frequencies can be generated by using the pattern obtained by repeating the code word and inverted code word three times each, and the pattern obtained by repeating the code word and inverted code word six times each.

TABLE 2

| Data word | Code word |
|---|---|
| (0000) | (0011 1110 0111) = 3E7$_h$ |
| (0001) | (0011 1100 1111) = 3CF$_h$ |
| (0010) | (1111 1001 1100) = F9C$_h$ |
| (0011) | (1111 0011 1100) = E3C$_h$ |
| (0100) | (1110 0111 1100) = E7C$_h$ |
| (0101) | (1100 1111 1100) = CFC$_h$ |
| (0110) | (0011 1111 0011) = 3F3$_h$ |
| (0111) | (1111 0000 1111) = F0F$_h$ |
| (1000) | (1111 1000 0111) = F87$_h$ |
| (1001) | (1100 1100 1111) = CCF$_h$ |
| (1010) | (1110 0110 0111) = E67$_h$ |
| (1011) | (1100 1110 0111) = CE7$_h$ |
| (1100) | (1110 0111 0011) = E73$_h$ |
| (1101) | (1100 1111 0011) = CF3$_h$ |
| (1110) | (1111 0011 0011) = F33$_h$ |
| (1111) | (0011 1111 1100) = 3FC$_h$ |

Having such a constitution, in this embodiment, a pilot tone can be generated from the synchronous block composed of the preamble 1, gap 3, postamble 5, and parities of outer code. In this embodiment, meanwhile, two patterns are used for preamble and others, and the number of repetitions of code word and inverted code word of 4/12 conversion code is taken as three times and six times, but these are not limitative. Also a pattern capable of generating pilot tones of two or more different frequencies is also possible.

In the invention, meanwhile, as the error correction code, a method of composing a DC free block and a method of generating a digital pilot, by using sum codes possessing an inner code and an outer code are explained, but a similar constitution is also possible for other error correcting codes. Or, instead of a DC free control or pilot tone generation control by using all of parities of outer codes, only a part of the parities may be used. Furthermore, instead of composing one synchronous block from one inner code word, it is also possible to compose of a plurality of inner code words. The number of data bursts provided in one track is not limited to two, but may be another arbitrary number. The preamble length, gap length, and postamble length may not necessarily be integer multiples of the synchronous block length. These patterns of the embodiments are only examples, and it is not necessary to limit to the values of k1=8, k2=4, n=12. In the embodiment, it is sufficient for the frequencies of the pilot tones of the tracks adjacent to a specific section to be different, and two frequencies of pilot tones may be sufficient.

Figure 6:
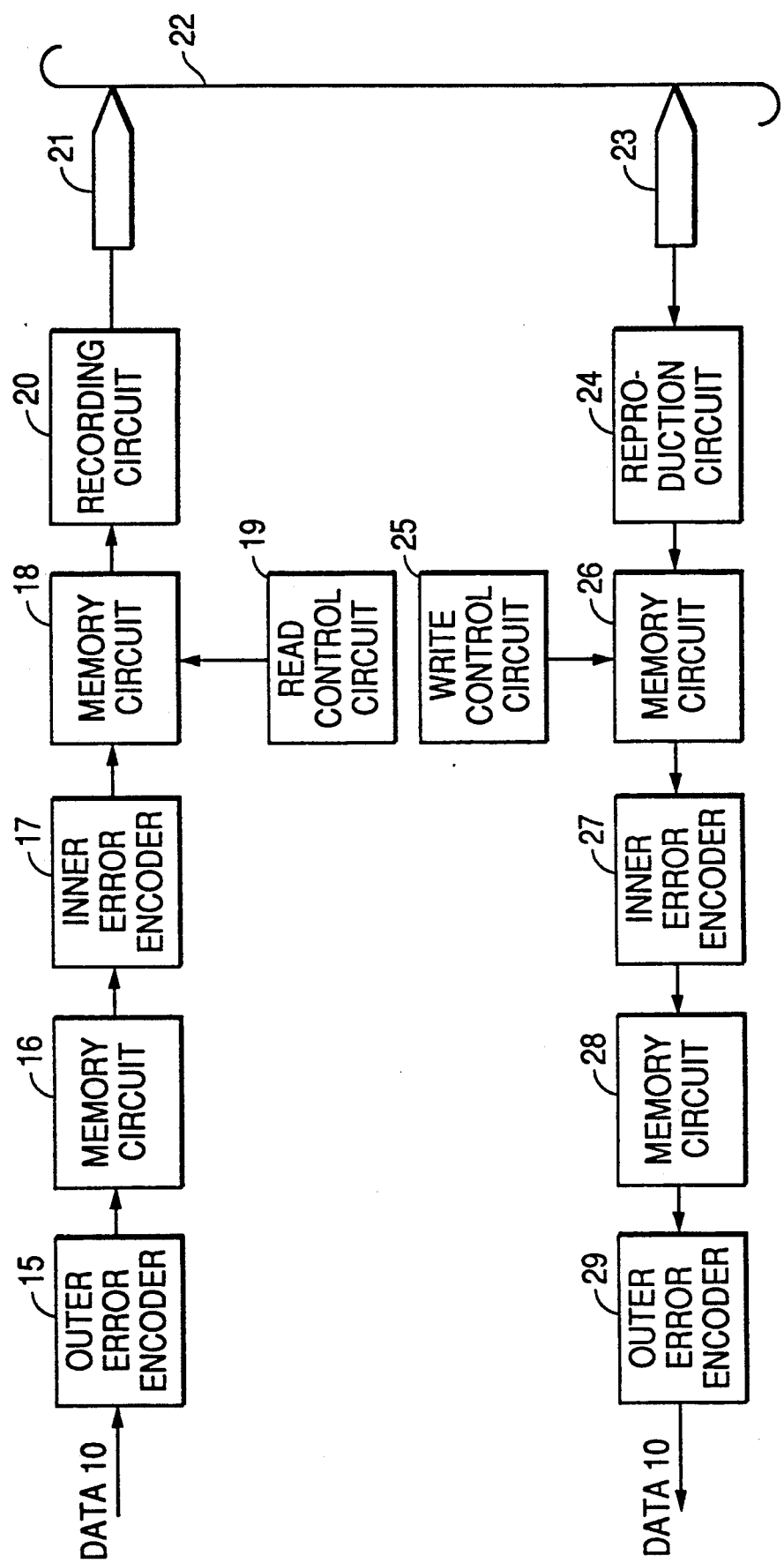
FIG. 6 is a block diagram of a circuit composition for realizing the present invention.

Finally, a means for realizing the first embodiment of the invention is explained by referring to FIG. 6. In FIG. 6, the data 10 arranged two-dimensionally (rectangularly) as shown in FIG. 3(a) by the known art is sent into an outer error encoder 15 sequentially in the row direction, and parities 11 of outer code are added as shown in FIG. 3(b), and the result is stored in a memory circuit 16. The data stored in the memory circuit 16 in the row direction is read out in the line direction, and the data is provided with the parities 12a of the inner code in an inner error encoder, as shown in FIG. 3(c), and the result is delivered. The data is stored in a memory circuit 18 sequentially in the line direction. From the memory circuit 18, the data is read out in the line direction in the sequence as shown in FIG. 3(d). Such reading control is effected in a reading control circuit 19. The reading control circuit 19 generates the reading address in the line direction of the memory in the memory circuit 18 so that the output may be obtained as shown in FIG. 3(d), which involves no technical difficulty. The output of the memory circuit 18 is recorded on a magnetic tape 22 through a recording circuit 20 composed of amplifier and circuits, and a recording head 21.

On the other hand, when reproducing, the reproduction signal from the magnetic tape 22 is stored in a memory circuit 25 through a magnetic head 23, and a reproduction circuit 24 composed of reproduction amplifier and circuits. The output of the reproduction circuit 24 is in the form of FIG. 3(d), and a write control circuit 26 stores the output of the reproduction circuit 24 in the memory circuit 26 in a form of FIG. 3(c). This operation is the reverse operation of the read control circuit 19, and the write address in the line direction into the memory in the memory circuit 26 is generated. The output from the memory circuit 26 corrects the error in the line direction in an inner error decoder 27, that is, the error in the data in the synchronous block shown in FIG. 1(b) is corrected by using the parities, thereby removing the beginning pattern, identification symbols and parities, and the data is stored in a memory circuit 28 in the form of FIG. 3(b). The output of the memory circuit 28 is read in the row direction, and the error in the row direction is corrected by using the parities of outer code in an outer error decoder 29, and the data is delivered without these parities. As a result, the data is in the two-dimensional (rectangular) form of FIG. 3(a), so that the original data is completely restored.

In FIG. 6, it is explained on the basis that the memory circuits 16, 28 and 19, 26, and the heads 21, 23 are independently provided, but where it is not necessary to record and reproduce simultaneously, these memory circuits and heads can be shared, and the circuit can be reduced. FIG. 6 is presented as means for realizing the first embodiment of the invention, but it is evident that the second and third embodiments can be realized by similar circuits. Thus, the invention realizes tracking of high precision in a very simple circuit constitution, and achieves a lower error rate.

What is claimed is:

1. A method of recording digital data and pilot tones superposed on the digital data in tracks formed on a recording medium, and performing tracking by using crosstalks of the pilot tones during reproducing, wherein only data recorded in a specific section of a track is subjected to DC free control so as to be set in a DC free state in which a recorded bit stream contains few DC components and few low-frequency components near DC, and wherein the pilot tones are not superposed on the data in the specific section, and wherein the tracking is performed in the specific section on the basis of the crosstalks of the pilot tones from adjacent tracks during reproducing.

2. A method as recited in claim 1, wherein the track possesses a plurality of data bursts composed of a plurality of synchronous blocks, and a gap section provided between each two adjacent bursts of the plurality of data bursts, and wherein the specific section is at least a part of said gap section.

3. A method as recited in claim 1, wherein the data recorded in the specific section is at least part of parities of error correction.

4. A method of recording digital data and pilot tones superposed on the digital data in tracks formed on a recording medium, and performing tracking by using crosstalks of the pilot tones during reproducing, wherein only data recorded in a specific section of a track is set in a DC free state in which a recorded bit stream contains few DC components and few low-frequency components near DC, and wherein the pilot tones are not superposed on the data in the specific section, and the tracking is performed on the basis of the crosstalks of the pilot tones from adjacent tracks in the specific section during reproducing, wherein data corresponding to the specific section is at least part of parities of error correction, and wherein Dc free control is effected on all data excluding a beginning pattern and identification symbol in a synchronous block corresponding to the specific section.

5. A method of recording digital data and pilot tones superposed on the digital data in tracks formed on a recording medium, and performing tracking by using crosstalks of the pilot tones during reproducing, wherein only data recorded in a specific section of a track is set in a DC free state in which a recorded bit stream contains few DC components and few low-frequency components near DC, and wherein the pilot tones are not superposed on the data in the specific section, and the tracking is performed on the basis of the crosstalks of the pilot tones from adjacent tracks in the specific section during reproducing, wherein data corresponding to the specific section is at least part of parties of error correction, an wherein DC free control is effected on all data excluding a beginning pattern, identification symbol and parities of error correction added to each synchronous code in a synchronous block corresponding to the specific section.

6. A method as recited in claim 4 or 5, wherein a 4/12 conversion code is used for a signal in a portion in which the DC free control is effected, and an 8/12 conversion code is used for a signal in a portion in which the DC free control is not effected.

7. A method of recording digital data in a track formed on a recording medium so as to generate a pilot tone, and performing tracking on the basis of a crosstalk of the pilot tone from an adjacent track during reproducing, wherein a pilot tone generation control is effected so that only data recorded in a specific section of a track generates the pilot tone, wherein the track possesses a plurality of data bursts composed of a plurality of synchronous blocks, and a gap section provided between each two adjacent bursts of the plurality of data bursts, and wherein the specific section is at least a part of said gap section.

8. A method of recording digital data in a track formed on a recording medium so as to generate a pilot tone, and performing tracking on the basis of a crosstalk of the pilot tone from an adjacent track during reproducing, wherein a pilot tone generation control is effected so that only data recorded in a specific section of a track generates the pilot tone, wherein the track possesses a plurality of data bursts composed of a plurality of synchronous blocks, and data recorded in the specific section is a parity of error correction.

9. A method as recited in claim 8, wherein the pilot tone generation control is not effected on a beginning pattern and identification symbol is a synchronous block corresponding to the specific section.

10. A method as recited in claim 8, wherein the pilot tone generation control is not effected on a beginning pattern, identification symbol and parity of error correction added to each synchronous code in a synchronous block corresponding to the specific section.

11. A method of recording digital data in a track formed on a recording medium so as to generate a pilot tone, and performing tracking on the basis of a crosstalk of the pilot tone from an adjacent track during reproducing, wherein a pilot tone generation control is effected so that only data recorded in a specific section of a track generates the pilot tone, wherein the track possesses data bursts composed of a plurality of synchronous blocks and data corresponding to the specific section is a parity of error correction, wherein pilot tone generation control is not effected on a beginning pattern and identification symbol in a synchronous block corresponding to the specific section, and wherein a 4/12 conversion code is sued for a signal in a portion in which the pilot tone generation control is effected, and an 8/12 conversion code is used for a signal in a portion in which the pilot tone generation control is not effected.

12. A method of recording digital data in a track formed on a recording medium so as to generate a pilot tone, and performing tracking on the basis of a crosstalk of the pilot tone from an adjacent track during reproducing, wherein a pilot tone generation control is effected so that only data recorded in a specific section of a track generates the pilot tone, wherein the track possesses data bursts composed of a plurality of synchronous blocks and data corresponding to the specific section is a parity of error correction, wherein pilot tone generation control is not effected on a beginning pattern, identification symbol and a parity of error correction added to each synchronous code in a synchronous block corresponding to the specific section, and wherein a 4/12 conversion code is used for a signal in a portion in which the pilot tone generation control is effected, and an 8/12 conversion code is used for a signal in a portion in which the pilot tone generation control is not effected.

* * * * *